United States Patent

[11] 3,627,774

| [72] | Inventors | Raymond Francois Jacques Sarbach<br>Rue Philibert Collet, Chatillon-sur-Chalaronne (Ain);<br>Dimitri Yavordios, Route de Thoissey, Chatillon-sur-Chalaronne (Ain); Le Hao Dong, 42 rue Pitol, Montpellier (Herault); Jacques Mizoule, Chatillon-sur-Chalaronne (Ain); Charles Ricci, 168 bis boulevard de le Croix-Rousse, Lyon (Rhone), all of France |
|------|-----------|---|
| [21] | Appl. No. | 58,147 |
| [22] | Filed | July 24, 1970 |
| [45] | Patented | Dec. 14, 1971 |
| [32] | Priority | July 24, 1969 |
| [33] | | France |
| [31] | | 6925288 |

[54] PYRIDOXINE PYRIDOXAMINE AND PYRIDOXAL FLUFENAMATE SALTS
1 Claim, No Drawings

[52] U.S. Cl. .................................................. 260/295 S, 260/297.5, 260/295 VB, 424/266
[51] Int. Cl. .................................................. C07d 31/34
[50] Field of Search.......................................... 260/297.5, 295 S, 295 VB

[56] References Cited
UNITED STATES PATENTS

| 3,206,463 | 9/1965 | Baetz | 260/295 VB |
| 3,418,416 | 12/1968 | Fourneau | 260/295 VB |

*Primary Examiner*—Alan L. Rotman
*Attorney*—Browdy & Neimark

ABSTRACT: The medicament contains pyridoxine flufenamate and an excipient to which may be added several compatible constituents such as vitamin $B_1$.

PYRIDOXINE PYRIDOXAMINE AND PYRIDOXAL FLUFENAMATE SALTS

The object of this invention is the introducing of pyridoxine flufenamate in human and veterinary therapy, said new body being endowed with anti-inflammatory, antalgic and antipyretic properties. Pyridoxine flufenamate has also some of the biologic and pharmacodynamic properties of vitamin B6.

Pyridoxine flufenamate is basically dealt hereinafter, however said body may be replaced by similar byproducts from other $B_6$ vitaminic factors, such as: pyridoxamine, pyridoxal, it being understood that said bodies have the same therapeutic properties as those indicated above.

Pyridoxine flufenamate is prepared according to standard medicinal weight and is presented, neat or in compatible mixture, under an improved pharmaceutical form, for instance under the form of tablets or capsules, or also under the form of suspension, suppositories, pomade, etc.

The formula of said body is indicated hereunder:

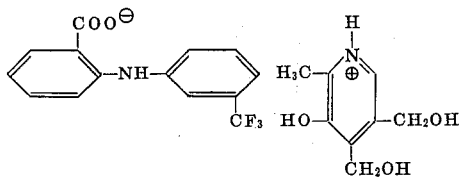

Rough formula: $C_{14}H_{10}F_3NO_2, C_8H_{11}NO_3$
i.e.: $C_{22}H_{21}F_3N_2O_5$
Molecular weight: 450.41
Base pyridoxine: 37.56 percent
Flufenamic acid: 62.44 percent The formulas of the corresponding salts of pyridoxamine or of pyridoxal are obtained by replacing in the above formula:

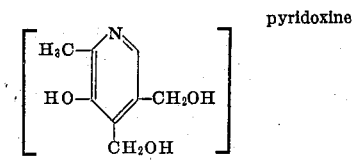 pyridoxine by

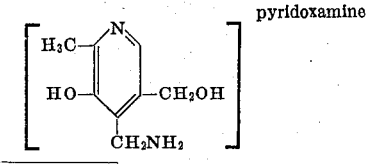 pyridoxamine or

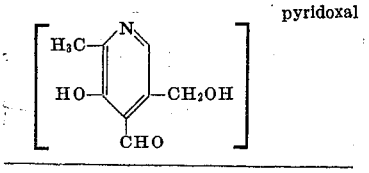 pyridoxal

I. PREPARATION PROCESS

First preparation process.

In a 250 ml. stoppered erlenmeyer, is poured 7.025 g. (0.025 mole) of flufenamic acid with 50 ml. of methanol. Then base pyridoxine is added (4.229 g. = 0.025 mole). The mixture is stirred mechanically during 5 minutes. The methanol is evaporated by means of a vacuum revolving evaporator and of a water bath at 40° C.

As soon as a white cream foam is formed, the vacuum is cut off.

THe mixture is then vacuum dried during 2 hours at 30°-35° C.

The product is crushed and vacuum dried again during one night without heating and secured from moisture.

Second preparation process.

The reaction is indicated hereunder:

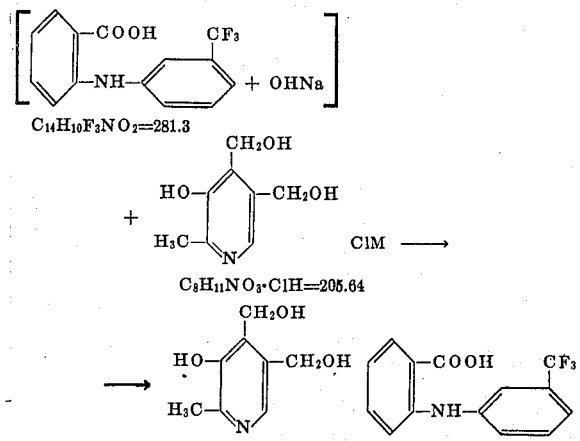

Preparation process

A warm solution containing 2.81 g. (0.01 mole) of flufenamic acid is added while being stirred in 20 ml. of water containing 0.40 g. (0.01 mole) of soda to a solution containing 2.06 g. (0.01 mole) of pyridoxine hydrochlorate in 15 ml. of water. The product crystallizes immediately and is placed into a refrigerator during 1 hour or 2. The product is then dried, washed with water and vacuum dried.

Thereby, 3.42 g. of pale greenish yellow crystals is obtained (yield: 76 percent); upon the recrystallization in ethanol at 95 percent and in water in presence of carbon, crystals remain colored.

II. PROPERTIES

Appearance: pale-yellow crystallin powder
Melting point: between 126° and 127° C
Moisture (Karl Fisher): under 0.5 percent
Hygrometric strength after 3 hours: between 0.9 and 1 percent
Solubility: highly soluble in methanol, ethanol at 96 percent, aceton; not soluble in water, benzene, ether, chloroform.
Ultraviolet spectrum: pyridoxine flufenamate shows in a methanolic solution and after dilution in distilled water, the following characteristics:
  maximum absorption: $\lambda=323\,\mu-289\,\mu$
  minimum absorption: $\lambda=253\,\mu$

III. TOXICOLOGIC AND PHARMACOLOGICAL SURVEY

This survey includes:
1°—Determination of toxicity
2°—Determination of anti-inflammatory power
3°—Determination of antalgic power
4°—Determination of antipyretic power

A. TOXICITY

This survey is conducted with 40 male Charles River mice weighing between 19 and 21 g. and shared out into 4 batches of 10 mice.

Each batch is given orally, and with volume of 0.5 ml./20 g. one of the following doses of pyridoxine flufenamate = 800, 1,200, 1,800, 2,700 mg./kg. in suspension into carboxymethylcellulose at 0.5 percent.

Mice are kept under watch during 5 days after which toxicity is noted.

Results are indicated hereunder:

| Pyridoxine flufenamate, mg./kg | 800 | 1200 | 1800 | 2700 |
|---|---|---|---|---|
| Death rate, percent | 10 | 40 | 70 | 80 |

A DL 50 equal to 1500 mg./kg. appear from these results.

B. ANTI-INFLAMMATORY POWER

Anti-inflammatory research is conducted on a rat leg oedema caused by intraplantar injection containing 0.50 ml. of carragenin solution at 1 percent.

Forty 115–125 g. male Charles River rats are thus divided into one test batch of 10 animals and 3 processed batches of 10 animals each. The treatment is given orally by means of a suspension one hour before the carragenin injection.

Pyridoxine flufenamate doses used are as follows:

4.8, 14.4 and 43.2 mg./kg.

Results

Three hours after the carragenin injection, results obtained are as indicated hereunder:

| Pyridoxine flufenamate dose, mg./kg. | 0 | 4.8 | 14.4 | 43.2 |
|---|---|---|---|---|
| Swelling, ml. | 1.16 | 0.75 | 0.70 | 0.59 |
| Inhibition rate of oedema, percent | | 35 | 40 | 49 |

Under these conditions, the DE rate is 45 mg./kg.

C. ANTALGIC POWER ON MICE

The test used is that of Siegmund.

An intraperitoneum injection of phenylbenzoquinone made on a mouse causes a painful syndrom which materializes by abdomen contortion.

Twelve male 19–21 g. Charles River mice are used by dose.

Pyridoxine flufenamate doses used are: 0 (test)—80—160 and 320 mg./kg.

The treatment is made orally.

Results

| Pyridoxine flufenamate dose, mg./kg. | 80 | 160 | 320 |
|---|---|---|---|
| Antalgic power, percent | 42 | 44 | 53 |

Under these conditions, the DE 50 rate is 300 mg./kg.

D. ANTIPYRETIC POWER

Over-temperature is caused to rats by subcutaneous injection of 10 ml./kg. of barm in suspension at 20 percent.

Three batches of 10 male 180–200 g. Charles River rats are made.

Batch 1 = Test batch
Batch 2 = Pyridoxine flufenamate at 80 mg./kg.
Batch 3 = Pyridoxine flufenamate at 320 mg./kg.

The treatment is carried out 4 hours after the injection of barm. Temperatures are read just before the beginning of the treatment and then every hour during 4 hours.

Results

Average temperature variations as from the beginning of the treatment

| | Tests | Pyridoxine flufenamate 80 mg./kg. | Pyridoxine flufenamate 160 mg./kg. |
|---|---|---|---|
| Number of hours after treatment: | | | |
| 1 | +0° 7C | 0 | 0 |
| 2 | +0° 8C | −0° 1C | −0° 2C |
| 3 | +1° 1C | 0 | −0° 3C |
| 4 | +1° 2C | 0 | −0° 1C |
| Accrued variations | +3° 8C | −0° 1C | −0° 6C |

Immediately after the 80 mg./kg. dose, the pyridoxine flufenamate hinders the progress of over-temperature resulting from the injection of barm.

Findings

Pyridoxine flufenamate has outstanding anti-inflammatory, antipyretic and antalgic properties.

Its therapeutic index (DL 50)/(DE 50) is high, particularly as concerns anti-inflammatory power and also antipyretic power.

IV. HUMAN AND ANIMAL THERAPEUTIC USE EXAMPLE

On the basis of the pharmacodynamic and toxicologic collected and set forth hereinabove, pyridoxine flufenamate possesses definite anti-inflammatory, antalgic and antipyretic properties.

Rhumatology is an excellent field for the use of the medicament.

Pyridoxine flufenamate is also especially recommended for treatment of neuritis, polyneuritis, cholecystis, etc. cases to which the various above-mentioned properties as well as specific properties of B6 vitamin are applicable all together.

In the case of neuritic diseases with an adult 1.50 to 2 g. of pyridoxine flufenamate may be given at the rate of 3 or 4 doses per day at regular intervals during the nycthemer.

The active constituent for these uses can appear under various pharmaceutical forms: tablets, capsules, suppositories...titrated at 250, 375, 500 mg.

Pyridoxine flufenamate may be given to children. In the case of rheumatic algy, for instance, 10 mg. per kilo of weight and per day will be prescribed, preferably under the form of syrup, of powder or granules titrated at 1 percent of 2 percent of active constituents.

According to specific directions, pyridoxine flufenamate may be associated with one or several other compatible active constituents, such as $B_1$ vitamin, for instance.

The medicament may also be used for anti-inflammatory, antalgic and antipyretic treatments with animals, particularly dogs, cats, horses, cattle and sheep.

We claim:
1. A compound of the formula

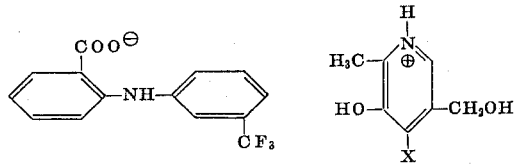

wherein X represents a member selected from the group consisting of $CH_2OH$, $CH_2NH_2$ or $CH=O$.

* * * * *

UNITED STATES PATENT OFFICE
CERTIFICATE OF CORRECTION

Patent No. 3,627,774           Dated Dec. 14, 1971

Inventor(s)   Raymond F. J. SARBACH et al.

It is certified that error appears in the above-identified patent and that said Letters Patent are hereby corrected as shown below:

In the title page, insert the following Assignment information:

--assignors to INSTITUT DE RECHERCHE SCIENTIFIQUE (IRS) Chatillon-Sur-Charlaronne (Aim, France)--

Signed and sealed this 1st day of August 1972.

(SEAL)
Attest:

EDWARD M. FLETCHER, JR.          ROBERT GOTTSCHALK
Attesting Officer                Commissioner of Patents